Feb. 15, 1927.  
J. A. REECE  
1,618,107  
DRAWING SHEET GLASS  
Filed Dec. 31, 1923  2 Sheets-Sheet 1

Feb. 15, 1927. 1,618,107
J. A. REECE
DRAWING SHEET GLASS
Filed Dec. 31, 1923 2 Sheets-Sheet 2

INVENTOR
Joseph A. Reece
BY C.A. Rowley
ATTORNEY

Patented Feb. 15, 1927.

1,618,107

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed December 31, 1923. Serial No. 683,596.

This invention relates to improvements in the art of drawing sheet glass, and more particularly to the art of drawing the sheet, in continuous form, downwardly from the molten source.

The principal object of the invention is to increase the productive capacity of the continuous tank furnace which furnishes the molten glass from which the sheet is drawn. By employing the principles of this invention a much greater daily production of sheet glass can be obtained from a furnace of given size.

In the most successful forms of sheet glass drawing apparatus heretofore used, the glass-producing materials are melted in one end of a rather long tank furnace, the molten glass flowing through the settling and refining portions of the tank to the opposite end where the surface glass flows into a shallow receptacle from which the sheet is drawn. Experience has shown that in installations of this type, although the main tank portions may hold a body of glass having a depth of several feet, only the upper stratum to the depth of a very few inches flows freely through the tank, and the lower strata of the molten glass are practically stagnant. Now it is essential that the molten glass remain a certain length of time in the tank to reach the proper stage of refinement before it may be successfully drawn into sheet form, and the surface area of this type of tank must bear such a relation to the amount of glass drawn from the tank that the surface glass will remain in the tank for the proper refining period. For example, if one attempted to draw two sheets from a furnace designed to feed a single sheet, the drain on the tank would be such that the surface stratum of glass would flow too rapidly through the furnace and would not have time to reach the properly refined condition. It has been considered necessary in such cases to greatly increase the surface area of the tank so that the rate of flow for the increased output would still allow all of the mobile surface glass to remain in the tank the necessary length of time.

According to this invention, the increased production is accomplished by increasing the depth of flow of the molten glass through the tank. For example, if the flowing stream of glass were made twice as deep as before, the size, or the drawing rate of the sheet could be substantially doubled without increasing the rate of flow through the furnace over that in present installations. This end is reached by withdrawing the molten glass, from which the sheet is subsequently formed, from the lower strata of glass in the tank, thus necessitating a flow of the lower and now inactive portions of the molten pool.

A pot or receptacle adapted to hold a relatively small and substantially constant quantity of molten glass is positioned beneath the end of the main refining tank, and a regulated stream of molten glass is allowed to flow from the bottom of the refining tank into this pot. The pot is provided with a narrow elongated slot in its lower portion through which the molten glass flows onto and down the opposite sides of a wedge-shaped slab or directing member supported beneath the pot. The thin streams of glass flowing down the opposite faces of the slab unite at the lower edge of the slab and are drawn downwardly therefrom in the form of a single sheet. This pot which holds the working supply of molten glass, is substantially enclosed except for the opening in its top for the incoming stream of glass from the refining tank, and the slot in its bottom through which the glass flows on to the sheet-forming slab. In this manner the working supply of molten glass is protected against dirt or solid products of combustion. The pot is supported within a furnace or heating chamber which practically surrounds the pot on all sides. By regulating the heat in this chamber the molten glass may be constantly maintained at the proper working temperature. This heating chamber, which is directly beneath that portion of the refining tank from which the molten glass flows into the pot, also serves to heat the molten glass within the refining tank adjacent the exit orifice, to facilitate the free flow of molten glass from the lower strata within the refining tank.

A sheet flowed or drawn downwardly may be formed much more rapidly than one drawn upwardly, since in the first case the force of gravity assists rather than retards the operation. By withdrawing the molten glass from the bottom of the tank, the formerly stagnant lower strata are kept in motion and a greatly increased depth of stream flow through the tank is provided, whereby the glass may be flowed from the tank rapidly and in increased quantity, without putting too great a drain on the tank. By first flowing this molten glass into an enclosed pot of substantially constant capacity, which pot is enclosed in a heated chamber, the temperature and head of the molten glass which flows downwardly onto the forming slab may be accurately and constantly controlled. The final result is to rapidly produce an increased quantity of sheet glass from a tank of relatively small capacity.

The above, and other objects and advantages of this invention will be better understood from the following detailed description of certain forms of apparatus embodying the principles of this invention.

In the accompanying drawings:

Fig. 3 is a view similar to Fig. 1, showing a modified form of the sheet-forming slab.

Fig. 4 is a transverse vertical section through still another form of slab.

Figure 1:
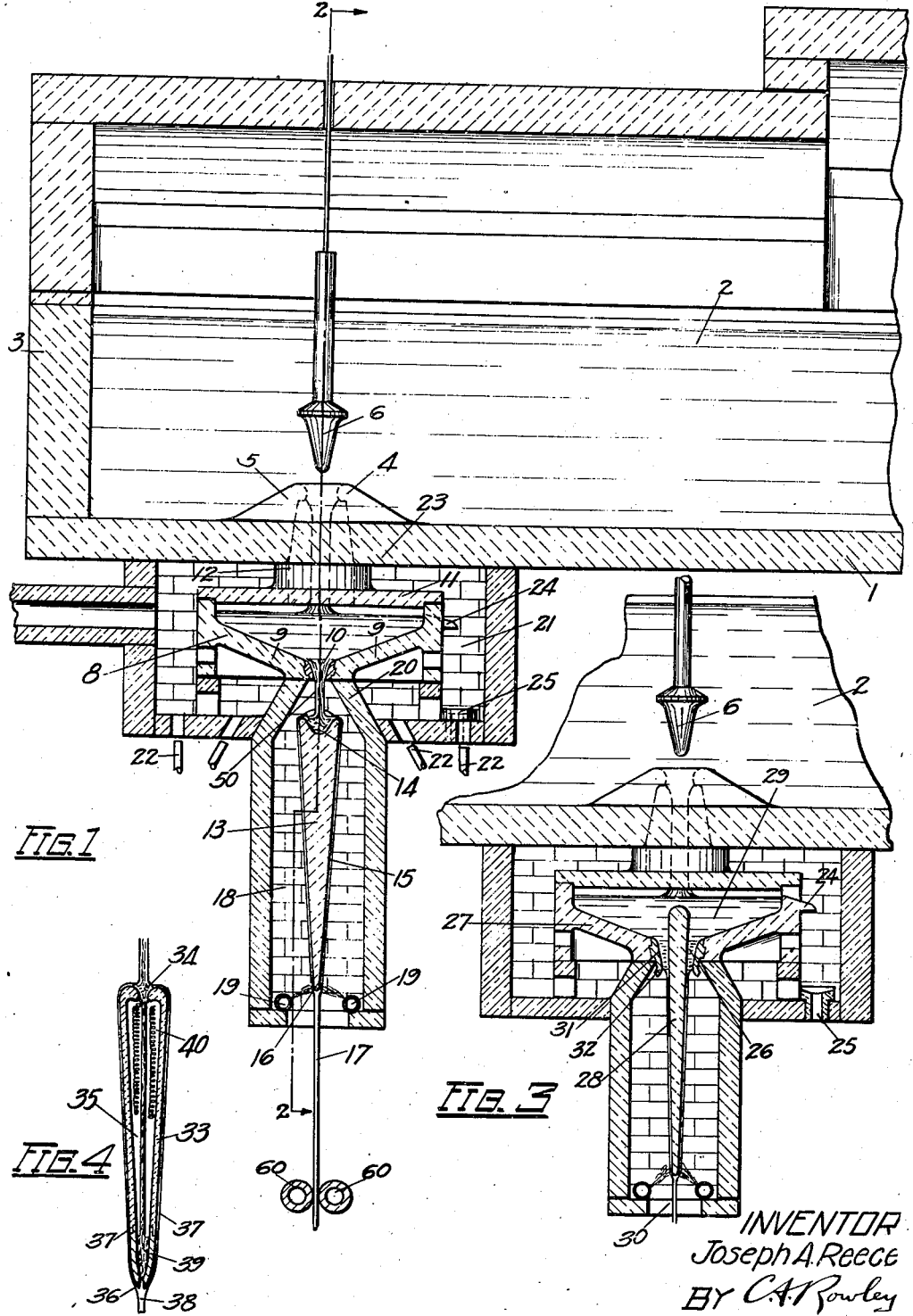
Fig. 1 is a longitudinal section through the refining end of the tank furnace, and a transverse vertical section through the pot and sheet-forming mechanism. This view is taken substantially on the line 1—1 of Fig. 2.
Figure 2:
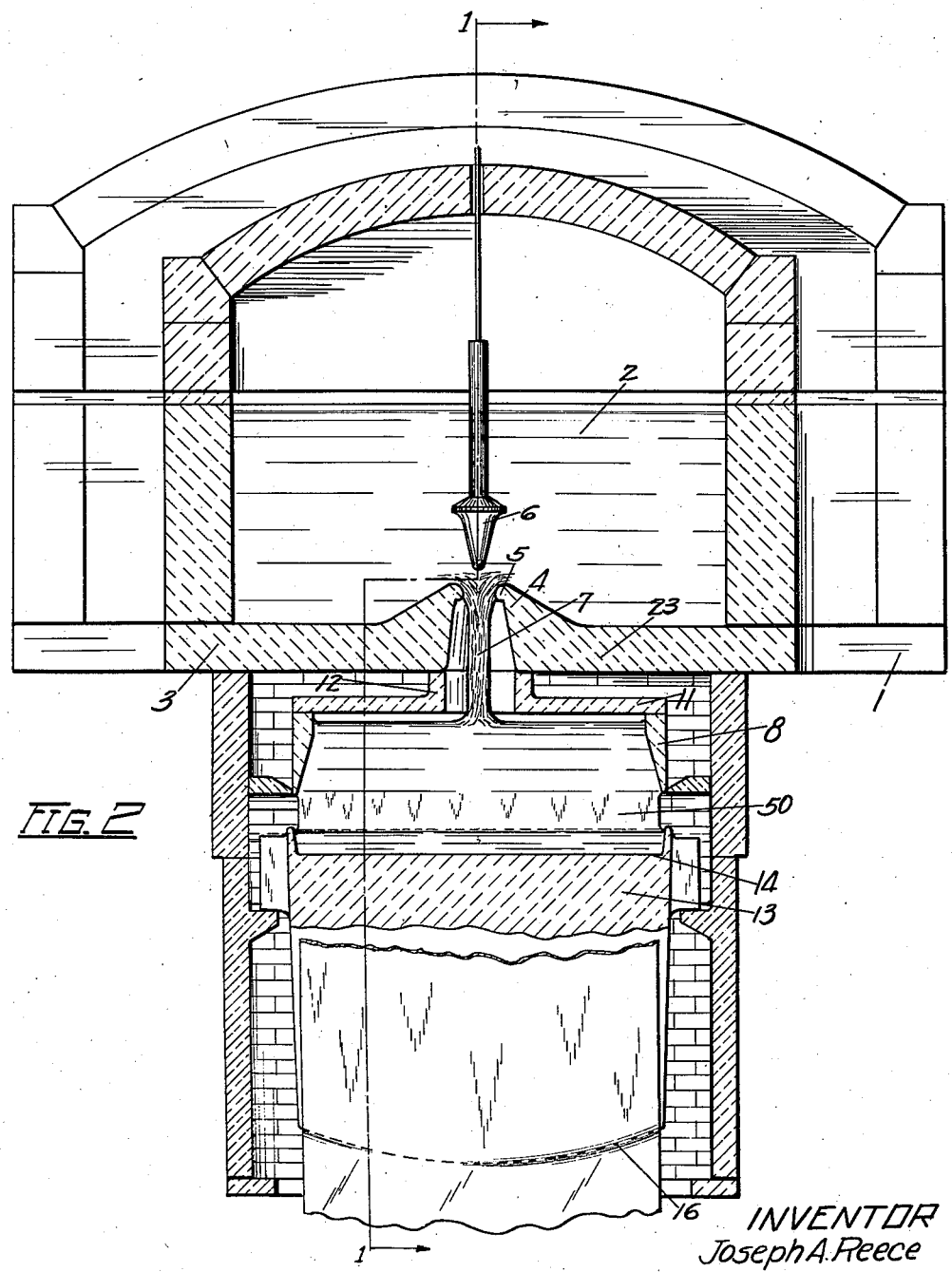
Fig. 2 is a vertical section taken at right angles to Fig. 1 and substantially on the line 2—2 of Fig. 1.

Referring first to Figs. 1 and 2 of the drawings, 1 indicates the continuous tank furnace, the molten glass 2 being first produced in the melting end of the furnace, not here shown but being at the right of Fig. 1, this glass flowing slowly through the furnace to the refining end 3. Adjacent the end of the refining portion of the tank, an exit orifice 4 is provided in the bottom wall of the tank. This orifice may be of any desired contour, but may be conventionally in the form of a round drain hole, as here shown, with the side walls 5 projecting upwardly somewhat into the tank, whereby the extreme lower stratum of glass in the refining tank will be held back from the exit orifice. A plug or other closure member 6 is suspended within the molten glass above the opening 4, and this plug may be lowered or raised to entirely cut off or partially impede the flow of glass through the opening. In this way the size of the stream of molten glass 7, which flows downwardly from the refining tank, may be regulated as desired.

Suitably supported beneath the opening 4 is a comparatively shallow refractory pot 8, the bottom walls 9 of which preferably slope downwardly toward a centrally positioned elongated slot 10 extending transversely of the bottom of the pot. The total area of this slot 10 will be substantially the same, or slightly less than, the area of orifice 4 in the refining tank, so that the amount of molten glass which normally flows downwardly from pot 8 through slot 10 will substantially equal the amount flowing downwardly into the pot from the refining tank thereabove. Pot 8 is preferably substantially enclosed by a cover-plate 11 provided with a central vertical passage surrounded by the cylindrical collar or ring 12, which extends up to and fits against the bottom of the refining tank at the flared lower end of orifice 4.

Directly beneath the slot 10 is positioned a refractory slab or forming member 13, preferably formed with a glass-receiving recess 14 in its upper end, and having downwardly converging side walls 15 which meet at the lower edge 16 of the slab. The stream of molten glass 50 which flows down through slot 10 from the pot 8 is received in recess 14 at the upper end of the slab, and this glass spills or overflows over the upper edges of the slab and flows in thin equal streams down the converging sides of the slab. The sheet of glass 17 is drawn downwardly from these streams of glass which meet and combine at the lower edge 16 of the wedge-shaped slab.

As shown in Fig. 2, the lower edge 16 of slab 13 may be made curved or arcuate, so that the molten glass flowing into the central portion of the sheet remains on the slab longer than the molten glass forming the sheet edges. This added retarding effect at the center, caused by the adhesion of the glass to the slab, will offset the more sluggish flowing action of the glass at the edges of the stream flow.

Any suitable means, such as indicated conventionally by rollers 60, for drawing and guiding the glass sheet 17 downwardly, and for supporting and carrying away the formed sheet may be used. Many forms of apparatus for this purpose have already been disclosed in the prior art.

The forming slab 13 is substantially enclosed by the protecting chamber 18, and the interior of this chamber will be heated in any suitable manner, for example by burners such as those shown at 19, to keep the slab and the streams of molten glass which flow down the sides of the slab at the proper temperature for the sheet-forming operation. Preferably, the upper portions 20 of the side walls of chamber 18 will be sloped inwardly and join with the bottom walls 9 of pot 8 adjacent the sides of slot 10. This is to allow a second furnace chamber 21, which substantially surrounds the entire pot 8, to direct its heat against as large a portion as possible of the lower surface of the pot. This furnace or heating chamber 21 may be heated by a plurality of burners such as indicated at 22, and serves not only to keep the pot 8 and the working supply of glass therein at the proper temperature, but also directs its heat against the bottom 23 of the refining tank adjacent the orifice 4 to keep the glass within the refining tank adjacent this orifice at a sufficiently high temperature to flow freely into the pot 8.

Pot 8 will be provided with a suitable overflow spout 24 at one side adjacent its upper edge to limit the maximum working supply of molten glass contained in this pot. Any excess of molten glass, which may flow through orifice 4 over that issuing from the pot through slot 10, will overflow through spout 24 and may be conveyed out of the furnace chamber 21 through any suitable drain 25. By suitably regulating the position of the plug or closure 6 with relation to orifice 4, the volume of the stream 7 flowing downwardly into the pot is so regulated that little or no overflow need take place through spout 24.

It will be noted that a substantially constant head of glass is maintained in the pot above the orifice 10 regardless of any fluctuations in depth of the main body of glass in the tank furnace. Also, it will be noted that this working supply of glass in the pot 8 is entirely enclosed and protected against dirt or the direct contact of the heating gases within the chamber 21. By properly regulating the burners 22, the temperature of this working supply of glass in pot 8 may be maintained practically constant, entirely independent of the temperature conditions prevailing in the furnace from which the glass supply is drawn.

In Fig. 3 a somewhat modified form of pot and sheet-forming slab is disclosed. In this construction, the slot 26 in the bottom of the pot 27 is made considerably wider than the slot 10 in the construction previously described, and the upper end of the wedge-shaped slab 28 is positioned within the working supply of molten glass 29 in the pot. Slab 28 projects downwardly through slot 26 so as to divide this slot into a pair of narrow elongated passages at either side of the slab through which thin streams of molten glass flow down the sides of the slab as in the form previously described, and are drawn away from the lower edge of the slab in the form of glass sheet 30. Refractory or metallic lining members 31 having outwardly flared lower ends as at 32, are preferably secured to the bottom walls of pot 27 along the sides of slot 26. These flared lower ends 32 will tend to permit a more free and even flow of glass down the side walls of the slab without the formation of dog-metal or other line-forming deposits along the side walls of the slot 26.

In the form of slab 33 disclosed in Fig. 4, the glass-receiving recess 34 at the top of the slab connects with a passage or hollow portion 35 extending downwardly through the slab to the lower edge 36. A portion of the molten glass flowing down from the supply pot into the recess 34 will overflow as before down the outer side walls of the slab, and another portion will flow down from recess 34 through the interior of the slab and join with the side streams 27 to form the sheet 38 which is drawn downwardly from the slab as in the constructions already described.

Preferably, the extreme lower portions 39 of the two side walls of slab 33 will be formed of nichrome or some other suitable heat resisting alloy.

If found necessary suitable electric heating elements, such as indicated conventionally at 40, may be provided within the upper portion of the slab to regulate the temperature of the several glass streams flowing around and through the forming slab 33.

Claims:

1. The method of making sheet glass, consisting in producing molten glass in a continuous tank furnace, flowing molten glass from the lower strata of glass in the tank in a regulated stream into a separately enclosed pool, and drawing glass downwardly from the pool in sheet form.

2. The method of making sheet glass, consisting in producing molten glass in a continuous tank furnace, flowing molten glass from the lower strata of glass in the tank into a separately enclosed pool, and flowing glass downwardly from the pool onto a slab from which it is drawn in sheet form.

3. The method of making sheet glass, consisting in producing molten glass in a continuous tank furnace, flowing molten glass from the lower strata of glass in the tank into a separately enclosed pool, and flowing glass downwardly from the pool onto the top of a downwardly tapered slab, and then drawing away in sheet form the glass which flows down the converging sides of the slab.

4. The method of making sheet glass, which consists in flowing molten glass onto and down the sides of a directing member, impeding the central portion of the flowing streams more than the edge portions, and drawing away the uniting streams in sheet form.

5. Apparatus for making sheet glass, comprising a tank furnace having an aperture in the bottom of its refining end, a pot positioned below the aperture and having a slotted bottom, and means for drawing away in sheet form the glass which passes downwardly through the slot.

6. Apparatus for making sheet glass, comprising a tank furnace having an operture in the bottom of its refining end, means for regulating the flow of molten glass through the aperture, a pot positioned below the aperture and having a slotted bottom, and means for drawing away in sheet form the glass which passes downwardly through the slot.

7. Apparatus for making sheet glass, comprising a tank furnace having an aperture in the bottom of its refining end, a pot positioned below the aperture and having a slotted bottom, a heating chamber within which the pot is enclosed, and means for drawing away in sheet form the glass which passes downwardly through the slot.

8. Apparatus for making sheet glass, comprising a tank furnace having an aperture in the bottom of its refining end, means for regulating the flow of molten glass through the aperture, a pot positioned below the aperture and having a slotted bottom, a heating chamber within which the pot is enclosed, and means for drawing away in sheet form the glass which passes downwardly through the slot.

9. Apparatus for making sheet glass, comprising a tank furnace having an aperture in the bottom of its refining end, a pot positioned below the aperture and having a slotted bottom, a slab positioned below the slot, and means for drawing away in sheet form the glass which flows from the slot upon and down the slab.

10. Apparatus for making sheet glass, comprising a tank furnace having an aperture in the bottom of its refining end, a pot positioned below the aperture and having a slotted bottom, a slab positioned below the slot, and means for drawing away in sheet form the glass which flows from the slot upon and around the slab.

11. In an apparatus for making sheet glass, an enclosed pot for supporting a pool of molten glass, the pot having an elongated slot in its bottom through which the glass flows to form the sheet, and a top having an aperture therein through which the supply of molten glass is replenished.

12. In an apparatus for making sheet glass, an enclosed pot for supporting a pool of molten glass, the pot having an elongated slot in its bottom through which the glass flows to form the sheet, and a cover-plate for the pot having an aperture through which the supply of molten glass is replenished.

13. In an apparatus for making sheet glass, an enclosed pot for supporting a pool of molten glass, the pot having an elongated slot in its bottom through which the glass flows to form the sheet, and having an overflow opening at one side for maintaining a constant head of glass in the pot, and a top for the pot having an aperture therein through which the supply of molten glass is replenished.

14. In an apparatus for making sheet glass, an enclosed pot for supporting a pool of molten glass, the pot having an elongated slot in its bottom through which the glass flows to form the sheet, and a top for the pot having an aperture therein through which the supply of molten glass is replenished, in combination with a heating chamber substantially surrounding the pot.

15. In an apparatus for making sheet glass, an enclosed pot for supporting a pool of molten glass, the pot having an elongated slot in its bottom through which the glass flows to form the sheet, and a cover-plate for the pot having an aperture through which the supply of molten glass is replenished, in combination with a heating chamber substantially surrounding the pot and cover-plate.

16. In an apparatus for making sheet glass, a vertically positioned slab, having downwardly converging sides, a recessed top, and a central slot extending from the top recess through the lower edge of the slab.

17. In an apparatus for making sheet glass, a vertically positioned slab, having downwardly converging sides, a recessed top, a central slot extending from the top recess through the lower edge of the slab, and heating means within the slab at either side of the slot.

18. In an apparatus for making sheet glass, a vertically positioned slab, having downwardly converging sides, and a curved lower edge at which the converging sides meet.

19. In an apparatus for making sheet glass, a vertically positioned slab, having downwardly converging sides, and a curved lower edge which is lower at the center than adjacent the sides of the slab, the converging sides meeting at the curved edge.

20. In an apparatus for making sheet glass, a vertically positioned slab, having downwardly converging sides, and a curved lower edge at which the converging sides meet, in combination with means for flowing molten glass onto and down the sides of the slab, and means for drawing this glass downwardly from the curved lower edge in sheet form.

21. In an apparatus for making sheet glass, a vertically positioned slab, having downwardly converging sides, and a curved lower edge which is lower at the center than adjacent the sides of the slab, the converging sides meeting at the curved edge, in combination with means for flowing molten glass onto and down the sides of the slab, and means for drawing this glass downwardly from the curved lower edge in sheet form.

22. In apparatus for making sheet glass, a vertically positioned slab, having a recessed top, downwardly converging sides, and a curved lower edge at which the converging sides meet, in combination with means for flowing molten glass into the recess and thence down the sides of the slab, and means for drawing this glass downwardly from the curved lower edge in sheet form.

Signed at Toledo, in the county of Lucas, and State of Ohio, this 28th day of December, 1923.

JOSEPH A. REECE.